United States Patent
Blum et al.

(10) Patent No.: US 10,507,733 B2
(45) Date of Patent: Dec. 17, 2019

(54) ENERGY SUPPLY VEHICLE FOR SUPPLYING AN ELECTRICALLY DRIVABLE MOTOR VEHICLE WITH ELECTRICAL ENERGY

(71) Applicant: AUDI AG, Ingolstadt (DE)

(72) Inventors: André Blum, Gaimersheim (DE); Michael Hinterberger, Großmehring (DE); Berthold Hellenthal, Schwanstetten (DE); Markus Fest, Schiltberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/791,472

(22) Filed: Oct. 24, 2017

(65) Prior Publication Data

US 2018/0126858 A1 May 10, 2018

(30) Foreign Application Priority Data

Nov. 8, 2016 (DE) .......................... 10 2016 221 829

(51) Int. Cl.
*B60L 11/18* (2006.01)
*B60L 53/30* (2019.01)
(Continued)

(52) U.S. Cl.
CPC .......... *B60L 11/1816* (2013.01); *B60L 53/14* (2019.02); *B60L 53/30* (2019.02); *B60L 53/35* (2019.02);
(Continued)

(58) Field of Classification Search
CPC .............. B60L 11/1816; B60L 11/1827; B60L 2230/16; B60L 2200/36; B60L 11/1824
(Continued)

(56) References Cited

U.S. PATENT DOCUMENTS 4,597,463 A * 7/1986 Barnard ................ B60K 6/105
180/165
8,751,157 B2 * 6/2014 Simon ................ G01C 21/3658
340/435
(Continued)

FOREIGN PATENT DOCUMENTS

| EP | 2538518 A1 | 12/2012 |
| JP | H11285109 A | 10/1999 |
| JP | 2009213337 A | 9/2009 |

OTHER PUBLICATIONS

German Examination Report dated Aug. 16, 2017 from corresponding German Application No. 10 2016 221 829.8 (6 pages).

*Primary Examiner* — Sun J Lin
(74) *Attorney, Agent, or Firm* — Maier & Maier, PLLC

(57) ABSTRACT

An energy supply vehicle for supplying an electrically drivable motor vehicle with an electrical energy. A drive unit for moving the energy supply vehicle, an electrical energy source for supplying electrical energy for the electrically drivable motor vehicle, and an electrical coupling device for electrical coupling the electrical energy source to the electrically drivable motor vehicle in order to transfer the electrical energy from the electrical energy source to the electrically drivable motor vehicle having a control unit including a communication device and is designed to guide the energy supply vehicle as a self-driving and remotely controlled vehicle and to control the electrical coupling device for an automatic electrical coupling of the electrically drivable motor vehicle.

8 Claims, 2 Drawing Sheets

(51) Int. Cl.
*B60L 53/14* (2019.01)
*B60L 53/35* (2019.01)

(52) U.S. Cl.
CPC ........ *B60L 2200/36* (2013.01); *Y02T 10/7011* (2013.01); *Y02T 10/7088* (2013.01); *Y02T 90/121* (2013.01); *Y02T 90/125* (2013.01); *Y02T 90/14* (2013.01); *Y02T 90/16* (2013.01)

(58) Field of Classification Search
USPC ........................................................ 716/109
See application file for complete search history.

(56) References Cited

U.S. PATENT DOCUMENTS

| | | | | |
|---|---|---|---|---|
| 2010/0315209 | A1* | 12/2010 | Mickelsen | H04N 5/4403 340/12.3 |
| 2010/0320965 | A1* | 12/2010 | Kissel, Jr. | B60L 5/40 320/109 |
| 2012/0212174 | A1 | 8/2012 | Ishikawa et al. | |
| 2012/0299531 | A1 | 11/2012 | Prosser et al. | |
| 2014/0327645 | A1* | 11/2014 | Matthews et al. | G06F 3/044 345/174 |
| 2016/0118828 | A1* | 4/2016 | Berry et al. | H02J 7/0054 307/10.1 |
| 2018/0119492 | A1* | 5/2018 | Nelson | E21B 7/023 |
| 2018/0162369 | A1* | 6/2018 | Colavincenzo | B60W 20/40 |
| 2018/0275653 | A1* | 9/2018 | Endo et al. | G05D 1/0061 |
| 2018/0362159 | A1* | 12/2018 | Tang et al. | B64C 39/024 |

\* cited by examiner

ENERGY SUPPLY VEHICLE FOR SUPPLYING AN ELECTRICALLY DRIVABLE MOTOR VEHICLE WITH ELECTRICAL ENERGY

FIELD

The invention relates to an energy supply vehicle for supplying an electrically drivable motor vehicle with electrical energy, comprising a drive unit for moving the energy supply vehicle, an electrical energy source for supplying electrical energy for the electrically drivable motor vehicle, and an electrical coupling device for electrical coupling of the electrical energy source to the electrically drivable motor vehicle in order to transfer the electrical energy from the electrical energy source to the electrically drivable motor vehicle. Furthermore, the invention relates to an industrial truck as well as a method for operating an energy supply vehicle in which the energy supply vehicle is moved by means of a drive unit in order to supply electrical energy for the electrically drivable motor vehicle by means of an electrical energy source of the energy supply vehicle and in which the electrically drivable motor vehicle is electrically coupled by means of an electrical coupling device of the energy supply vehicle in order to transfer the electrical energy from the electrical energy source to the electrically drivable motor vehicle.

BACKGROUND

Energy supply vehicles and industrial trucks as well as methods for operating energy supply vehicles are known in basic principle. Thus, for example, EP 2 538 518 A1 discloses a rapid charging device and a mobile charging device. The rapid charging device is mounted on a vehicle, so that a mobile charging device is formed. The rapid charging device comprises a plurality of energy storage units, which can be connected to an electrically drivable vehicle via an electrical circuit and a detachable electrical plug connector in order to charge its electrical energy storage unit. US 2012/0212174 A1 and US 2012/0299531 A1 also disclose vehicles of this kind.

Even though the prior art has proven itself, drawbacks are nonetheless found, in particular when the electrically drivable motor vehicle is constituted by an industrial truck. Industrial trucks with an electric drive unit obtain the electrical energy required for their intended driving operation from an energy storage unit that is contained in the industrial truck. The electrical energy storage unit is typically designed as a rechargeable battery. In the prior art, usually a lead acid battery, which supplies a battery voltage of about 24 V to about 80 V and an electrical capacitance of about several hundred ampere hours (Ah), is provided for such a rechargeable battery. Industrial trucks of this kind are employed, for example, as pallet trucks, forklift trucks, traction vehicles, or the like. They are generally driven by a driver; that is, the control of the industrial truck is in the hands of a driver on board the industrial truck.

In recent times, besides driver-operated industrial trucks, also self-driving or remotely controlled industrial trucks have been employed. Preferably, what is involved here are autonomously navigating industrial trucks, which independently transport goods from a given pickup site to a given target site. Trailers, which are correspondingly pulled by the industrial truck, may come into question here as well. Furthermore, the industrial trucks can also be remotely controlled, at least in part.

Because of the properties of lead acid rechargeable batteries that are usually used in industrial trucks, in particular as electrical energy storage units, the charging of the rechargeable batteries generally occurs externally to the respective industrial trucks due to the high capacity of the energy storage units. This means that the respective rechargeable battery is uninstalled from the respective industrial truck and connected to an appropriate charging station. The charging station charges the rechargeable battery over several hours. In the case of smaller industrial trucks, it can also be provided that the industrial truck is parked at the charging station for the duration of the charging operation. Fundamentally, however, a great expenditure of time is required in order to charge the rechargeable battery of the industrial truck. This applies fundamentally, of course, for other kinds of vehicles as well.

Particularly in the case autonomously driving industrial trucks, but also in the case of remotely controlled industrial trucks, it is not generally provided that the rechargeable battery is uninstalled or exchanged for the purpose of charging, but rather the industrial trucks are taken out of intended transport operation in order to charge the rechargeable battery or else charged repeatedly by way of inductive charging areas during the intended operation. For this purpose, a corresponding complicated and cost-intensive infrastructure is required in terms of building structure, the consequence of which is, moreover, an inability to use the autonomously controlled industrial truck in a flexible manner.

Furthermore, because the charging of the rechargeable batteries is carried out by means of a charging device connected to a public energy supply grid, the charging power is limited to the power that is available at the respective terminal of the public energy supply grid. The rechargeable battery can be charged, for this very reason, only with a limited power. Furthermore, the charging device would also need to have a correspondingly high-power design in order to be able to supply a suitably high charging power.

SUMMARY

The invention is therefore based on the object of improving the utilization of electrically drivable motor vehicles, in particular industrial trucks.

The invention proposes an energy supply vehicle, an industrial truck, and a method in accordance with the disclosure.

In regard to a generic energy supply vehicle, it is proposed, in particular, that said energy supply vehicle has a control unit, which comprises a communication device, and is designed to guide the energy supply vehicle as a self-driving and/or remotely controlled vehicle and to control the coupling device for automated electrical coupling of the electrically drivable motor vehicle.

In regard to a generic industrial truck, it is proposed, in particular, that said industrial truck is designed as an energy supply vehicle in accordance with the invention.

In terms of the method, it is proposed, in particular, that the energy supply vehicle is guided in a self-driving and/or remotely controlled manner by means of a control unit, which comprises a communication device, and the coupling device is controlled by means of the control unit for automated electrical coupling of the electrically drivable motor vehicle.

The invention is based on the knowledge that the reliability of operation of electrically drivable motor vehicles can be markedly improved when an energy supply vehicle is utilized for supplying the electrically drivable motor vehicle, which can be guided as a self-driving and/or remotely controlled vehicle. It is possible in this way to achieve an automated operation of the energy supply vehicle, so that, overall, the energy supply of electrically drivable motor vehicle is improved and the utilization of the energy supply vehicle itself and hence also the support of the electrically drivable motor vehicles can also be improved. This has proven to be especially advantageous in the case of industrial trucks, the operation of which is normally limited to a given area, such as, for example, a production hall, a production site, and/or the like. It is possible by means of the invention to operate the energy supply vehicle without a driver. The energy supply vehicle can hereby be guided as an autonomous vehicle or self-driving vehicle by means of the control unit or, beyond this, it can also be guided by a central station in an at least partially remotely controlled manner. Of course, these two possibilities can also be combined with each other.

The energy supply vehicle serves for supplying the electrically drivable motor vehicle with electrical energy. For this purpose, the energy supply vehicle comprises the electrical energy source, which can have, for example, a solar module, a wind turbine, a fuel cell, a generator driven by a combustion engine, and/or the like. For realization of its mobility, the energy supply vehicle has a suitable mechanical design, such as, for example, a chassis that is borne by drivable and controllable wheels and/or the like. The units or devices required for the intended operation of the energy supply vehicle can then be arranged on the chassis. Accordingly, the energy supply vehicle can be made available to a respective electrically drivable motor vehicle in order to supply the latter with electrical energy. This is of advantage, in particular, when the electrically drivable motor vehicle is in intended operation and its electrical energy storage units have attained a state of charge that impedes, restricts, and/or even prevents the intended operation of the electrically drivable motor vehicle. The energy supply vehicle enables an energy supply to take place preferably at the site at which the electrically drivable motor vehicle is located, so that it is not necessary to convey the electrically drivable motor vehicle to a charging station.

In order to make possible an energy transfer from the energy supply vehicle to the motor vehicle, the energy supply vehicle comprises the electrical coupling device. Said electrical coupling device is designed for electrical coupling of the electrically drivable motor vehicle, so that, as intended, the electrical energy can be transferred from the energy supply vehicle to the electrically drivable motor vehicle. Because the energy supply vehicle is guided without a driver, it proves to be especially appropriate that the coupling device is designed so as to be able to couple the electrically drivable motor vehicle automatically. For this purpose, the control unit can control the coupling device correspondingly. For this purpose, the coupling device can have, for example, a robot arm, which provides a corresponding electrical cable with an electrical plug connector, which is designed in an appropriate way to be coupled to a complementary plug connector of the electrically drivable motor vehicle. In this way, it is possible to produce a wired coupling. Furthermore, it is also possible, of course, to design the electrically drivable motor vehicle in such a way that a wireless coupling based on magnetic fields and/or the like, for example, is created. For this purpose, it can then be provided that the coupling device comprises a suitable electrical coil, which is arranged in such a way that it interacts with a counterpart coil of the electrically drivable motor vehicle. In this way, energy can then be transmitted wirelessly.

For the purpose of transferring electrical energy, the coupling device can produce an electrical coupling between the energy source of the energy supply vehicle and the electrically drivable vehicle in a wired and/or wireless manner.

The energy supply vehicle is a land vehicle in the present case, in particular a two-track or multi-track motor vehicle, which has its own drive device. By means of the drive device, the energy supply vehicle can be moved in an intended way. For this purpose, it can be provided that the drive device comprises its own energy source, which is preferably also contained in the energy supply vehicle.

Furthermore, it can be provided, of course, that the electrical energy source also supplies electrical energy, at least in part, to the drive device of the energy supply vehicle, in particular when the drive device is designed, at least in part, as an electric drive device.

An electrically drivable motor vehicle is, in particular, a motor vehicle that utilizes electrical energy, at least in part, for its intended driving operation or its intended function. Furthermore, it is also possible to provide a conventional drive, which, for example, obtains energy by combustion of fossil fuels or the like. The motor vehicle is preferably an electric vehicle, a hybrid vehicle, and/or the like. The motor vehicle is, in particular, an industrial truck, but it can also be an automobile, in particular a passenger automobile. The invention is not limited to industrial trucks.

The energy supply vehicle can be designed as a self-driving motor vehicle. What is meant here are, in particular, motor vehicles that can be guided without the influence of a driver. Such a self-driving motor vehicle can preferably also be operated without a driver. In this connection, the motor vehicle can also be referred to as an autonomous motor vehicle, which is designed for autonomous driving.

Furthermore, the energy supply vehicle can also be designed as a remotely controlled motor vehicle, which, for example, can be controlled by a central station or else by another device with corresponding control commands relating to the intended driving operation of the energy supply vehicle. Of course, these embodiments can also be combined with one another in that, for example, the energy supply vehicle is guided autonomously in predeterminable areas of operation, whereas, in other areas, it can be guided, for example, by remote control. It can also be provided that the energy supply vehicle is guided autonomously and an overall situation is monitored by a central station or the like, for example, and intervention in the autonomously controlled driving operation occurs by way of appropriate control commands only as needed.

The energy supply vehicle is therefore preferably also an electrically drivable motor vehicle, more preferably an electric vehicle or a hybrid vehicle.

In order that the self-driving property of the energy supply vehicle can be achieved, the control unit further comprises a plurality of suitable sensors, which serve for the detection of properties of the environment of the energy supply vehicle. The physical quantities recorded by the sensors are analyzed, so that comprehensive information, in particular in relation to a route to be traveled, is available to the control unit. For this purpose, it is possible to provide, among other things, a positional detection, by means of which an exact positioning of the energy supply vehicle can be made possible. Corresponding data can be determined, for example, by use of a global positioning system (GPS) or the like. Furthermore, it is also possible to store detailed maps in a memory unit of the control unit in the form of electrical data that can be employed for navigation of the energy supply vehicle. Furthermore, it can also be provided, of course, that the control unit receives appropriate control commands from the central station or the like in regard to operation of the energy supply vehicle. The central station then ensures a correspondingly safe and reliable operation of the energy supply vehicle. For this purpose, the communication device in the control unit can be utilized so as to be able to produce a preferably wireless communication link to the central station. Furthermore, the communication device can also serve for the purpose of notifying a charging station or the like about a target toward which to drive, such as, for example, a position of the electrically drivable motor vehicle that is to be supplied with electrical energy, by transmission of corresponding data to the communication device. For this purpose, it can be provided, for example, that the electrically drivable motor vehicle itself emits a corresponding signal to the energy supply vehicle. Furthermore, it can also be provided that the electrically drivable motor vehicle transmits such a signal to the central station, which then transmits a corresponding signal to the energy supply vehicle. It is possible in this way to avoid conflicting communications.

Furthermore, it is possible by way of the communication device also to detect by means of the control unit where, for example, a charging station is available. For this purpose, it can be provided that the respective charging stations emit corresponding signals, such as, for example, a type of radio signal and/or the like. Preferably, the signals can be individually coded, so that they can be assigned to respective communication partners. It is possible in this way to guide the energy supply vehicle to a suitable charging station when, for example, a charging of an energy storage unit of the energy supply vehicle is required for continuation of its intended function.

Once the control unit has detected a target position, it is possible in the case of an autonomous or self-driving operation, to guide the energy supply vehicle by means of the control unit to the target position in an automated manner. Alternatively or additionally, it is also possible to provide an appropriate remote control. Once the target position has been reached and if the target position involves an electrically drivable motor vehicle that is to be supplied with electrical energy or a charging station, it can be provided that the coupling device is activated by means of the control unit and, indeed, in such a way that the coupling device is automatically electrically coupled to the electrically drivable motor vehicle or to the charging station. It is possible in this way to achieve a transfer of electrical energy.

In accordance with an enhancement, it is proposed that the energy supply vehicle is designed as an energy storage vehicle for transporting electrical energy to an electrically drivable motor vehicle, for which purpose the electrical energy source has an electrical energy storage unit for storing the electrical energy to be transported. The electrical energy storage unit is preferably designed as a kind of rechargeable battery and, indeed, in particular, as a rechargeable battery based on lithium ion technology. In this way, it is possible to obtain a high-endurance rechargeable battery with a large energy storage density, so that large quantities of energy can be transported for electrically drivable motor vehicles by means of the energy supply vehicle. Furthermore, it can be provided, of course, that also a possible drive of the energy supply vehicle itself is supplied from the electrical energy storage unit with electrical energy for the intended transport operation. In this way, it is possible to transport the electrical energy for electrically drivable motor vehicles in a simple way, in particular when the electrically drivable motor vehicle is in an area in which no charging possibility for its electrical energy storage unit is available within reach. This has proven to be especially advantageous when the electrically drivable motor vehicle is incapable or only limitedly capable of carrying out its intended driving operation due to the low state of charge of its energy storage unit. In this case, it is then possible for electrical energy to be transported for electrically drivable motor vehicles by means of the energy supply vehicle and the electrical energy storage unit of the electrically drivable motor vehicle is charged via the electrical coupling device of the energy storage vehicle. Accordingly, the energy storage vehicle serves in basic principle as an intermediate storage unit for electrical energy that is to be provided to the electrically drivable motor vehicle. Accordingly, the electrically drivable motor vehicle preferably does not need to suspend its intended operation. In particular, it can be provided that, during its intended operation, the electrically drivable motor vehicle is supplied with electrical energy from the energy supply vehicle.

This has proven to be especially advantageous when the electrically drivable motor vehicle is an industrial truck and the energy supply vehicle or the energy storage vehicle is likewise designed as a kind of industrial truck. This configuration can be utilized advantageously, in particular in the area of production and manufacturing plants, because these areas are especially suitable for the use of autonomous driving or of remotely controlled driving or else can be equipped in a simple way for this purpose. Furthermore, it is possible, particularly in this case, to markedly increase an important availability of the electrically drivable motor vehicle, which is here an industrial truck.

In accordance with an advantageous enhancement, it is proposed that the coupling device is designed for capacitive coupling of the electrically drivable motor vehicle. In this way, it is not necessary to make a wired connection between the energy supply vehicle or energy storage vehicle and the electrically drivable motor vehicle. In this case, an alternating electric field can serve as a coupling medium. For this purpose, it can be provided that the coupling device and also the electrically drivable motor vehicle, which is to be supplied with electrical energy, each have a corresponding electrically conductive coupling surface, via which the capacitive coupling between the energy supply vehicle or the energy storage vehicle and the electrically drivable motor vehicle can be produced. Especially for an automated coupling, it has proven to be especially advantageous, in particular, when the corresponding coupling surfaces are arranged at an outer side of the housing of the electrically drivable motor vehicle, which can be achieved in a simple way by means of the coupling device. Thus, it can be provided, for example, that a robot arm of the coupling device provides a corresponding coupling surface, which is arranged at a corresponding coupling surface of the electrically drivable motor vehicle by means of the robot arm. No electrical connection needs to exist between these surfaces. They can thus be electrically insulated with respect to each other. This has also proven to be advantageous, in particular, for reasons of electrical safety in that, in this case, no electrically contactable surfaces are present. Accordingly, it is possible to provide an electrically insulating coating at the coupling surfaces.

In accordance with another embodiment, it is proposed that the communication device has an input unit, which is connected to the control unit for manual input of a control command. This embodiment makes it possible for persons who are present in the vicinity of the energy supply vehicle or energy storage vehicle to be able to input, if need be, corresponding control commands in regard to, for example, which electrically drivable motor vehicle is next to be supplied with electrical energy, or the like. Furthermore, it can also be provided that corresponding control commands for route guidance and/or the like can be input. Especially advantageously, the input unit is designed to record a gesture of the person as manual input and to assign this to a control command. In this way, it is possible, for example, to be able to input safety-relevant commands to the energy supply vehicle or energy storage vehicle without direct contact. This increases not only the safety, in particular in regard to personal protection, but it is also possible, moreover, to input maneuvering commands or the like, by means of which the energy supply vehicle or the energy storage vehicle can be driven especially advantageously to a desired position in order to be able to transfer the electrical energy as intended. Even though, in the present case, the function in regard to the electrically drivable motor vehicle has been described in regard to the energy storage vehicle, this also applies equally, of course, for the charging of the energy storage units of the energy storage vehicle at a charging station, or the like.

It has proven to be especially advantageous when the coupling device has a holder unit and a coupling element that can be connected detachably to the holder unit for producing an electrical connection to the electrically drivable motor vehicle. In this way, it is possible, by exchanging the coupling element, to create a suitable coupling possibility for producing the electrical coupling to the electrically drivable motor vehicle. Accordingly, it is possible in a simple way to match the coupling device of the energy supply vehicle or energy storage vehicle to different possibilities of electrical coupling of the electrically drivable motor vehicle, in particular when the electrically drivable motor vehicles to be supplied provide different coupling possibilities. In this way, it is possible to achieve a modular construction of the coupling device, which can be matched in a simple way to diverse requirements on site in regard to the respective electrically drivable motor vehicle. For this purpose, it can be provided that the energy supply vehicle or energy storage vehicle carries a plurality of suitable different coupling elements with it and activates them depending on the type of electrically drivable motor vehicle to be supplied or connects them to the holder unit. In this way, it is possible in a simple way to achieve a preferably automated matching to the respective electrically drivable motor vehicle.

It has proven to be especially advantageous when positional data of a position of the electrically drivable motor vehicle are determined and the positional data are transmitted to the communication device and hence also to the control unit. In this way, it is possible in a simple way to make available the position of the electrically drivable motor vehicle to the energy supply vehicle or the energy storage vehicle, so that the energy supply vehicle or the energy storage vehicle can reach the electrically drivable motor vehicle without a driver. In the case of a remotely controlled energy supply vehicle, the communication can also be provided via the central station.

In accordance with an enhancement, it is proposed that the energy supply vehicle is driven in an automated manner to the position of the electrically drivable motor vehicle and, when the position is reached, the electrically drivable motor vehicle is electrically coupled in an automated manner by means of the coupling device. In this way, no manual interventions are required, so that not only are time and effort reduced, but also the reliability and the electrical safety can be improved.

Preferably, by means of an input unit for manual input of a control command, a gesture, assigned to the control command, of a person positioned in the near vicinity of the energy supply vehicle is recorded and assigned to the control command by means of the control unit. As a result, it is possible in a simple way to control manually the energy supply vehicle or the energy storage vehicle, even when it is designed as a driverless vehicle. The manual control can comprise, for example, a stop command, a drive command, a position command, and a direction command, or the like. Furthermore, it is also possible, of course, to provide corresponding commands in regard to the electrical coupling of the electrically drivable motor vehicle in that, by means of a gesture, for example, the command is issued to disconnect the electrical coupling of the electrically drivable motor vehicle and to release the electrically drivable motor vehicle for its intended operation, or the like.

Belonging to the invention are also enhancements of the method according to the invention, which have features such as those that have already been described in connection with the enhancements of the motor vehicle according to the invention. For this reason, the corresponding enhancements of the method according to the invention are not described here once again.

BRIEF DESCRIPTION OF THE DRAWINGS

An exemplary embodiment of the invention is described below. For this purpose.

In the exemplary embodiment explained below, what is involved is a preferred embodiment of the invention. In the exemplary embodiment, the described components of the embodiment each represent individual features of the invention that are to be regarded independently of one another and each of which enhances the invention independently in each case as well and hence are also to be regarded as individual integral parts of the invention or as integral parts of the invention that are in a combination different from the combination shown. Furthermore, the described embodiment can also be supplemented by additional features of the invention already described.

In the figures, functionally identical elements are each furnished with the same reference numbers.

DETAILED DESCRIPTION OF THE DRAWINGS

Figure 1:
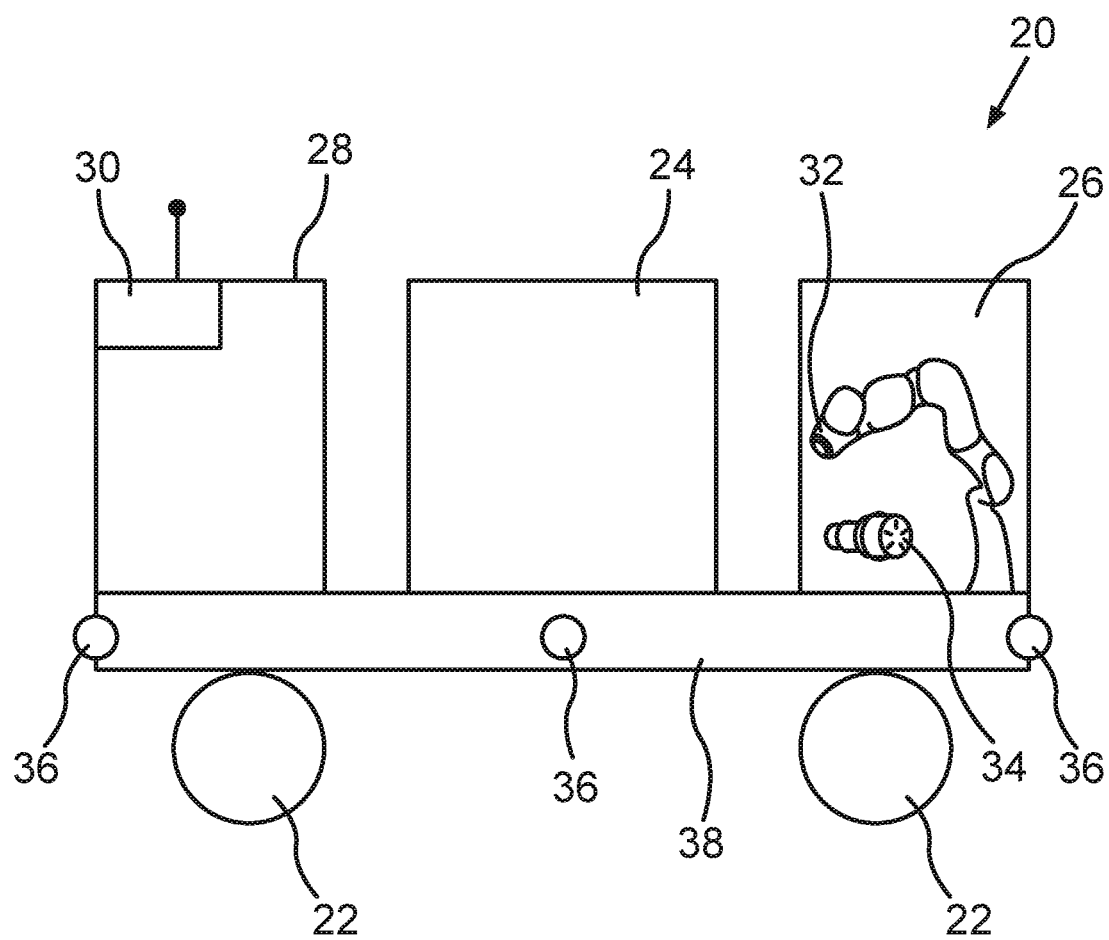
FIG. 1 shows, in a schematic side view, a construction for an energy storage vehicle according to the invention.

FIG. 1 shows, in a schematic side view, an energy storage vehicle 20 as an energy supply vehicle, which, in the present case, is designed as a kind of industrial truck. In the present case, the energy storage vehicle 20 is provided for the purpose of being guided as an autonomous vehicle within an area of a production facility. For this purpose, the energy storage vehicle 20 comprises a corresponding vehicle construction, having a drive unit 22 that serves for driving the energy storage vehicle 20. Provided for this purpose are steerable wheels, which are driven by means of the drive unit 22. In the present case, the drive unit 22 is an electrical drive unit, so that the energy storage vehicle 20 is an electric vehicle.

The energy storage vehicle 20 comprises a platform 38, on which a lithium ion rechargeable battery 24 is arranged as an electrical energy storage unit or electrical energy source. In the present case, the lithium ion rechargeable battery 24, for example, has a capacity of about 50 kWh.

Attached to the platform 38 is, furthermore, a robot arm 26 as a coupling device, which serves for electrical coupling of the lithium ion rechargeable battery 24 to an electrically drivable motor vehicle in order to transfer the electrical energy from the lithium ion rechargeable battery 24 to the electrically drivable motor vehicle. For this purpose, the robot arm 26 comprises, at one end, a holder unit 24, at which a coupling element 34, which can be connected to the holder unit 32, is detachably arranged for producing an electrical connection to the electrically drivable motor vehicle. In the present case, the coupling element is formed by a plug, which is not illustrated. Not illustrated in FIG. 1 is the fact that the robot arm 26 is constructed so as to exchange the coupling element 34 as needed, so that different electrically drivable motor vehicles can be electrically coupled to the energy storage vehicle 20. Moreover, this also applies to a charging of the lithium ion rechargeable battery 24, for which purpose a corresponding electrical coupling to a charging station, which is not illustrated, can be produced. The robot arm 26 is electrically connected to the lithium ion rechargeable battery 24. Not illustrated is a switch unit, by means of which an energy transfer can be controlled. For this purpose, the switch unit is connected to a control unit 28, which likewise is arranged at the platform 38. By means of the control unit 28, it is also possible for the robot arm 26 to be controlled as needed.

It is further provided that the control unit 28 comprises a communication device 30, which, in the present case, utilizes radio frequency as the transmission medium. The control unit 28 can be in communication link to a central station, which is not illustrated, using communication technology via the communication device 30. In this way, it is possible to exchange data and parameters with the central station. Furthermore, it is also possible to transmit driving or control commands from the central station to the control unit 28.

In the present case, the control unit 28 is designed to guide the energy storage vehicle 20 as a self-driving vehicle, that is, autonomously. For this purpose, a plurality of environmental sensors 36 are arranged at the platform 38, by means of which the required conditions can be detected in order that the control unit 28 is capable of guiding the energy storage vehicle 20 autonomously.

The control unit 28 is further designed to control the coupling device 26 for automated electrical coupling of the electrically drivable motor vehicle. The energy storage vehicle 20 is therefore guided autonomously to the electrically drivable motor vehicle in the present case by means of the control unit 28. Once the electrically drivable motor vehicle is reached, the driving operation of the energy storage vehicle 20 is terminated and the coupling device 26 is placed in operation. For this purpose, the control unit 28 controls the robot arm 26 in such a way that the suitable coupling element 34 is arranged at the holder unit 32. For this purpose, the robot arm 26 is operated in such a way that it retrieves the suitable coupling element 34 from a storage unit, which is not illustrated, and couples it by means of the holder unit 32. Subsequently, the robot arm 26 is controlled by means of the control unit 28 in such a way that the coupling element 34 is electrically coupled to a corresponding counterpart element of the electrically drivable motor vehicle, so that a transfer of electrical energy is made possible. The control unit 28 then initiates the energy transfer by means of suitable control commands to the switch unit, which is not illustrated.

If the electrically drivable motor vehicle has been supplied with a predetermined quantity of energy or if a command is issued for discontinuing further energy transfer, the energy transfer is terminated by means of a suitable control command at the switch unit. Subsequently, the robot arm 26 travels into a transport position, so that the energy storage vehicle 20 can continue its intended energy transport function by resuming driving operation. It can be provided, depending on the state of charge of the lithium ion rechargeable battery 24, that another electrically drivable motor vehicle is driven up in order to supply it with electrical energy. If, in contrast, the state of charge of the lithium ion rechargeable battery 24 is low, it is instead possible also to provide the driving up to a charging station, which then is likewise coupled, preferably again by means of the robot arm 26, in the same way as the electrically drivable motor vehicle.

In the present case, the exemplary embodiment provides that an electrically conductive connection is produced between the energy storage vehicle 20 and the electrically drivable motor vehicle. Alternatively, it is also possible, of course, to provide a capacitive coupling when the electrically drivable motor vehicle is designed for this purpose. In this case, a correspondingly suitable coupling element 34 is selected and fastened at the holder unit 32, so that, by means of capacitive coupling, a corresponding energy transfer can take place.

In the present case, it is further provided that the environmental sensors 36 comprise a camera, which is connected to the control unit 28. The control unit 28 is designed, moreover, to detect gestures of persons in the recording area of the camera and to assign predetermined control commands. In this way, it is possible for persons located in the surroundings of the energy storage vehicle 20 to make manual inputs by gestures in order to be able to carry out control functions in regard to the energy storage vehicle 20, for example.

Figure 2:
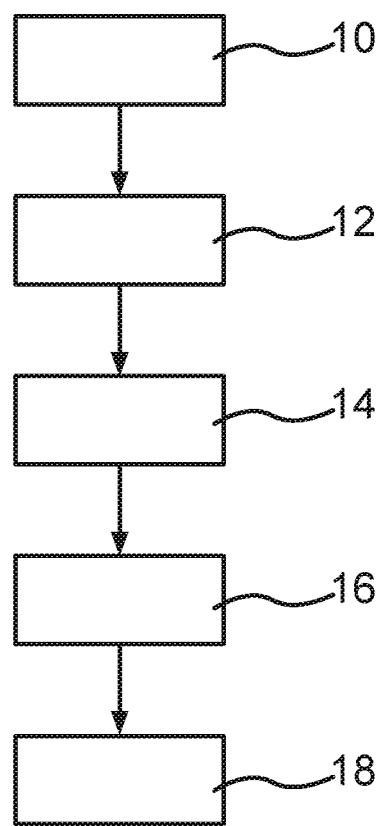
FIG. 2 shows, in a schematic flow chart, a method sequence according to the invention.

FIG. 2 shows a possible method sequence in a schematic flow chart. In a step 10, it is provided in the present case that the lithium ion rechargeable battery 24 is slowly charged via a connection terminal of the energy storage vehicle 20 to a charging station, which, in turn, is connected to a public energy supply grid, for example with an electrical power of 3.7 kW, when a charging occurs at a single-phase alternating voltage connection terminal of the generic kind, or 11 kW or 22 kW, when a charging occurs via a corresponding connection terminal to the public energy supply grid with a three-phase alternating voltage connection terminal, such as, for example, CEE 16 A or CEE 32 A, or the like.

In step 12, the energy storage vehicle 20 is driven autonomously in an area in which industrial trucks are present or are in intended operation as electrically drivable motor vehicles. A respective industrial truck emits a request signal for electrical energy once its energy storage unit has a state of charge that is smaller than a predetermined state of charge. This signal is received by the energy storage vehicle 20 and its positional data are determined from the signal. Subsequently, the control unit 28 guides the energy storage vehicle 20 to the position of the respective industrial truck. As already explained above, an electrical coupling is then produced by means of the robot arm 26 and the industrial truck or its energy storage unit is charged with energy from the lithium ion rechargeable battery 24. After a predetermined state of charge has been reached by the energy storage unit of the industrial truck or when a lower limit of the state of charge of the lithium ion rechargeable battery 24 is reached, the charging operation is terminated and the electrical coupling is suspended. The industrial truck can then continue its intended operation.

In step 14, the remaining quantity of charge in the lithium ion rechargeable battery 24 is determined. Depending on the state of charge, it is possible either to drive up another industrial truck in order to supply it with electrical energy or, however, the energy storage vehicle 20 drives to a suitable charging station in order to recharge the lithium ion rechargeable battery 24.

In step 16, it is provided that the coupling or decoupling at the industrial truck or the charging station is carried out in an automated manner without human intervention. This can be provided both for a wired electrical coupling and for a wireless electrical coupling.

In step 18, for the further operational management, automated request messages and, if need be, also messages as to the state of charge are determined for further industrial trucks and a driving route for the further operational management of the energy storage vehicle 20 is determined independently. Accordingly, the control unit 28 can independently plan charging operations. Alternatively, however, it is also possible to provide the control from a higher-level production system or the central station.

Overall, the exemplary embodiment shows how, by way of the invention, the operation of industrial trucks that are made up of electrically drivable vehicles can be improved. In this way, a nearly continual operation of the industrial trucks can be achieved. Furthermore, the industrial trucks can also be employed in areas in which, for diverse reasons, charging stations are not present or are not permitted to be present. In this way, the invention is also suitable, in particular, for a utilization under technically difficult conditions.

With the invention, it is possible, in particular, to achieve the following advantages:
- It is possible to avoid complicated infrastructure measures and the costs thereof for the operation, in particular induction coils laid in the floor, which serve for the energy supply of industrial trucks.
- Long charging pauses for industrial trucks—for example, overnight—or the like, can be avoided.
- Likewise, the necessity of installing and uninstalling rechargeable batteries in larger industrial trucks in order to charge them can be dispensed with.
- The invention makes possible a high flexibility, because a charging of the industrial truck can occur as needed. In the process, the guiding of the energy supply vehicle is not limited to a fixed route. Electrical energy can also be made available as needed in terms of time and location. It is merely necessary that the energy storage vehicle 20 can reach the electrically drivable vehicle, in particular the industrial truck.
- Large surface areas for charging stations and charging sites can be reduced or dispensed with.
- Known AC/DC charging technology can largely be avoided.
- The charging time for the electrically drivable vehicle or the industrial truck can be substantially reduced, because a direct-current charging operation at high charging current can be realized. Furthermore, the operation can occur at the place where the electrically drivable vehicle or industrial truck is directly found.
- The electrically drivable motor vehicle of the industrial truck can be charged without human action. In this way, it is possible to save time and effort.
- Given a suitable design, the energy supply vehicle can also be used as a mobile decentralized energy supply device. For this purpose, it can be provided that the energy supply vehicle 20 has an energy converter, such as, for example, an inverter, which delivers the electrical energy supplied by the lithium ion rechargeable battery 24 in the form of an alternating current voltage of 230 V or the like, for example. In this way, it is possible to create a mobile power supply without interruption.

Even though, in the present case, the invention has been explained on the basis of industrial trucks, the invention is not limited thereto, however. In basic principle, the invention can also be employed, of course, for any motor vehicles and, in particular, for electrically drivable motor vehicles.

Furthermore, it is noted that the advantages and features presented in relation to the energy supply vehicle also apply, of course, equally to the correspondingly constructed industrial truck as well as to the corresponding method, and vice versa. Finally, method features can also be formulated for device features, and vice versa.

The invention claimed is:

1. An energy supply vehicle for supplying an electrically drivable motor vehicle with an electrical energy, the energy supply vehicle comprising:
   - a drive unit for moving the energy supply vehicle, the drive unit includes an electrical energy source for supplying electrical energy for the electrically drivable motor vehicle, and an electrical coupling device for electrical coupling the electrical energy source to the electrically drivable motor vehicle in order to transfer the electrical energy from the electrical energy source to the electrically drivable motor vehicle; and
   - a control unit, which includes a communication device and is designed to guide the energy supply vehicle as a self-driving and remotely controlled vehicle and to control the electrical coupling device for automatic electrical coupling of the electrically drivable motor vehicle,
   - wherein the control unit further includes at least one sensor so that an environment of the energy supply vehicle is detected and analyzed for the self-driving of the energy supply vehicle,
   - wherein the electrical coupling device is designed for capacitive coupling of the electrically drivable motor vehicle, and
   - wherein the electrical coupling device includes a robot arm with a coupling surface on which an electrically insulating coating is provided so that electrical safety is enhanced with the capacitive coupling for supplying electrical energy of the electrically drivable motor vehicle.

2. The energy supply vehicle according to claim 1, wherein the energy supply vehicle is designed as an energy storage vehicle for transporting electrical energy to an electrically drivable motor vehicle, for which purpose the electrical energy source has an electrical energy storage unit for storing the electrical energy to be transported.

3. The energy supply vehicle according to claim 1, wherein the communication device has an input unit connected to the control unit for manual input of a control command.

4. The energy supply vehicle according to claim 1, wherein the electrical coupling device has a holder unit and a coupling element that can be connected detachably to the holder unit for producing an electrical connection to the electrically drivable motor vehicle.

5. A method for operating an energy supply vehicle, the method comprising:

the energy supply vehicle is driven by a drive unit in order to supply an electrical energy by an electrical energy source of the energy supply vehicle for an electrically drivable motor vehicle and in which the electrical energy source is electrically coupled to the electrically drivable motor vehicle by means of an electrical coupling device of the energy supply vehicle in order to transfer the electrical energy from the electrical energy source to the electrically drivable motor vehicle, wherein the energy supply vehicle is guided by a control unit, which includes a communication device, in a self-driving and remotely controlled manner and the electrical coupling device is controlled by the control unit for an automated electrical coupling of the electrically drivable motor vehicle, wherein the control unit further includes at least one sensor so that an environment of the energy supply vehicle is detected and analyzed for the self-driving of the energy supply vehicle, wherein the electrical coupling device is designed for capacitive coupling of the electrically drivable motor vehicle, and wherein the electrical coupling device includes a robot arm with a coupling surface on which an electrically insulating coating is provided so that electrical safety is enhanced with the capacitive coupling for supplying electrical energy of the electrically drivable motor vehicle.

6. The method according to claim 5, wherein positional data of a position of the electrically drivable motor vehicle are determined and the positional data are transmitted to the communication device.

7. The method according to claim 6, wherein the energy supply vehicle is driven in an automated manner to the position of the electrically drivable motor vehicle, and, when the energy supply vehicle reaches the position, the electrically drivable motor vehicle, is electrically coupled in an automated manner by means of the electrical coupling device.

8. The method according to claim 5, wherein by an input unit for a manual input of a control command, a gesture, assigned to the control command, of a person positioned in a near vicinity of the energy supply vehicle is detected and assigned to the control command by the control unit.

* * * * *